(12) United States Patent
Gonnsen et al.

(10) Patent No.: US 10,494,122 B2
(45) Date of Patent: Dec. 3, 2019

(54) COMPONENT DESIGN SYSTEM FOR GENERATING AIRCRAFT COMPONENT DESIGNS

(71) Applicant: AIRBUS OPERATIONS GMBH, Hamburg (DE)

(72) Inventors: Johannes Gonnsen, Hamburg (DE); Irene Bueno-Moreno, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 75 days.

(21) Appl. No.: 15/783,008

(22) Filed: Oct. 13, 2017

(65) Prior Publication Data

US 2018/0037339 A1 Feb. 8, 2018

Related U.S. Application Data

(63) Continuation of application No. PCT/EP2016/062347, filed on Jun. 1, 2016.

(30) Foreign Application Priority Data

Jun. 1, 2015 (EP) ..................................... 15170090

(51) Int. Cl.
*G05B 19/4099* (2006.01)
*B33Y 50/00* (2015.01)
(Continued)

(52) U.S. Cl.
CPC ............... *B64F 5/10* (2017.01); *B33Y 50/00* (2014.12); *G05B 19/4099* (2013.01);
(Continued)

(58) Field of Classification Search
CPC . G05B 19/4097; G05B 19/4181; G06F 16/00; G06F 17/50
(Continued)

(56) References Cited

U.S. PATENT DOCUMENTS 8,180,597 B2* 5/2012 Connor .................. G06F 17/50
703/1
2011/0161057 A1 6/2011 Redondo Garcia et al.
(Continued)

FOREIGN PATENT DOCUMENTS

| DE | 10041031 A1 | 3/2002 |
|----|----|----|
| EP | 2573695 A2 | 3/2013 |
| EP | 2778992 A1 | 9/2014 |

OTHER PUBLICATIONS

European Patent Office, European Search Report for EP Application No. EP15170090 dated Nov. 2, 2015.
(Continued)

*Primary Examiner* — Michael J Brown
(74) *Attorney, Agent, or Firm* — Lorenz & Kopf LLP

(57) ABSTRACT

The disclosed subject matter relates to a component design system for generating aircraft component designs. The component design system includes a database having a set of rules representative for different load characteristics of different component geometries. The component design system further includes an input module for inputting user-specific load characteristics relating to an aircraft component to be generated and a processing unit for determining a variety of geometrically different aircraft component designs based on the input user-specific load characteristics and the set of rules. The disclosed subject matter also relates to an aircraft assembly system having a component design system, a method for generating aircraft component designs, a program element, and a computer-readable medium.

13 Claims, 3 Drawing Sheets

(51) Int. Cl.
*B64F 5/10* (2017.01)
*G05B 19/4097* (2006.01)
*G06F 16/00* (2019.01)
*G06F 17/50* (2006.01)

(52) U.S. Cl.
CPC .............. *G05B 2219/35134* (2013.01); *G05B 2219/49007* (2013.01); *G06F 2217/02* (2013.01); *G06F 2217/06* (2013.01); *G06F 2217/12* (2013.01)

(58) Field of Classification Search
USPC .......... 700/83, 98, 17, 97, 95, 118, 182, 180
See application file for complete search history.

(56) References Cited

U.S. PATENT DOCUMENTS

| | | |
|---|---|---|
| 2012/0239354 A1 | 9/2012 | Sieben |
| 2015/0231835 A1* | 8/2015 | Pridie .................... B29C 70/38 264/40.1 |
| 2018/0037339 A1 | 2/2018 | Gonnsen et al. |

OTHER PUBLICATIONS

International Searching Authority, International Search Report for International Application No. PCT/EP2016/062347 dated Sep. 15, 2016.

* cited by examiner

COMPONENT DESIGN SYSTEM FOR GENERATING AIRCRAFT COMPONENT DESIGNS

CROSS-REFERENCE TO PRIORITY APPLICATIONS

This application is a continuation of international patent application number PCT/EP2016/062347, having an international filing date of Jun. 1, 2016, which claims priority to European patent application number EP 15 170 090.3, having a filing date of Jun. 1, 2015. The content of the referenced applications is incorporated by reference herein.

TECHNICAL FIELD

Embodiments of the disclosed subject matter generally relate to the design of structural components. In particular, embodiments of the invention relate to a component design system for generating aircraft component designs. The disclosure further relates to an aircraft assembly system, a method for generating aircraft component designs, a program element and a computer-readable medium.

BACKGROUND

Before manufacturing components, especially structural components, a design process of the component has to be executed in order to better understand the mechanical behavior of the component due to external loads. In other words, the component is designed in a first step and then a simulation process is conducted in order to collect information about the behavior of the component if external loads are applied to the component. After the component has been designed and the simulation process has been conducted, the component can further be optimized with respect to its shape such that the load distribution within the component is enhanced in accordance with the requirements to be fulfilled by the component during an operation mode. Therefore, only one component is the basis for the design and optimization process which component is optimized in its shape, for example in an iterative design and optimization process.

United States patent document US 2011/0161057 describes methods and systems for optimizing the design of aerodynamic surfaces using computational fluid dynamics.

German patent document DE 100 41 031 A1 describes a method for configuring an arrangement of components in an aircraft.

BRIEF SUMMARY

It is an object of the present disclosure to improve the design process of components.

This object can be achieved by the subject-matter of the independent claims. Further exemplary embodiments are evident from the dependent claims and the following description.

According to an aspect of the present disclosure, a component design system for generating a variety of aircraft component designs is provided. The component design system which, in the following, is also called system comprises a data base having a set of rules representative for different load characteristics of different component geometries. The component design system further comprises an input module for inputting user-specific load characteristics relating to an aircraft component to be generated as well as a processing unit for determining a variety of geometrically different aircraft component designs based on the input user-specific load characteristics and the set of rules. In other words, the system or the processing unit is adapted for determining structure variants of an aircraft component.

Using such a system, provides the opportunity to choose between the plurality of different options for differently shaped aircraft component designs which are suitable for a specific load case. The load case which is comprised by the load characteristics can be input by the user such that for this specific load case, the plurality of design options can be generated. Afterwards, in a decision process, at least one of the plurality of different design options can be chosen by the user and the desired load distribution within the component can be achieved.

Therefore, the data base may comprise a set of rules which set of rules comprises simulation data and/or empirical data for the different load characteristics of the different component geometries. In other words, the data base, e.g. the set of rules, comprises simulation data which were generated during a separate simulation process, for example by a finite element method (FEM). The set of rules may further comprise empirical data, for example measurement data or experimental data, being representative for the different load characteristics of the different component geometries. The load characteristics may for instance comprise data for the mechanical behavior of certain component geometries. It should be considered that each component geometry may have different mechanical characteristics and therefore also different mechanical behaviors. The load characteristics may be defined at least by the load path within the certain component geometry. Therein, the load path is a result of an applied force which can be an external force acting on the component geometry. The load path may describe the distribution of forces within the component geometry.

For example, the input module is a personal computer or an interface via which the user-specific load characteristics can be supplied to the component design system. The specific load characteristics may be defined by forces acting on the aircraft component load paths within the aircraft component as well as thermal loads acting on the aircraft component to be generated. In other words, the user provides predefined constraints or requirements by inputting the user-specific load characteristics which are to be fulfilled by the aircraft component to be generated.

Furthermore, a processing unit uses the set of rules as well as the user-specific load characteristics in order to determine the variety, e.g. a plurality of geometrically different aircraft component designs. In other words, not only one component is generated or determined based on the inputs of the user rather a variety of different design options is provided between which the user can choose the most suitable. The determination of the variety of geometrically different aircraft component designs can be combined with an iterative process such that the user can input further constraints and requirements, e.g. load characteristics in order to vary the variety of geometrically different aircraft components until the most suitable design option is identified. The variety of geometrically different aircraft component designs may represent optimized aircraft components to be manufactured. Moreover, the determination of the variety of geometrically different aircraft component designs can be conducted simultaneously. The determining process can be an automatically executed process which uses at least one input information, for example the user-specific load characteristics in order to independently determine the most suitable aircraft component designs. For example, most suitable means that the variety of geometrically different aircraft component designs are adapted or optimized for a certain position within an object which itself is assembled based on at least one of the variety of geometrically different aircraft component designs. For example, the object is an aircraft. In other words, at least one of the geometrically different aircraft component designs, which has been determined as most suitable for a certain position within the aircraft, is assembled within the aircraft in a later step.

It should be mentioned that component geometries are to be distinguished from aircraft component designs. In particular, component geometries may be described by bodies or objects with a predetermined geometry. For such component geometries detailed analysis data are available from the data base, for example from empirical data or simulation data. In contrast, aircraft component designs may be design options for bodies or objects which are determined or developed by the processing unit taking into account the user-specific load characteristics and the set of rules which set of rules is based on the component geometries. However, the load characteristics of the component geometries may be imagined as input data for generating the variety of component designs.

According to an embodiment of the invention, the system is a component design system and a manufacturing system and further comprises a manufacturing module for manufacturing an aircraft component in accordance with at least one of the determined aircraft component designs.

For example, the manufacturing of the aircraft component can be conducted after the determination of the variety of geometrically different aircraft component designs and after the selection of at least one of the variety of geometrically different aircraft component designs. The manufacturing module may thus manufacture the aircraft component which is most suitable for a certain position or for a specific type of aircraft component within an aircraft.

According to another embodiment of the invention, the system is a component design system and an assembling system and further comprises an assembling module for assembling an aircraft using at least of the determined aircraft component designs.

The assembling of the aircraft can be conducted after the aircraft component has been manufactured. In this manner, it is possible to use the manufactured aircraft component which was manufactured in the manufacturing module in order to assemble the aircraft. For example, the manufactured aircraft component is assembled to the aircraft at a certain position which requires a specific mechanical robustness that can be fulfilled by the manufactured aircraft component. In other words, the aircraft component may be selected out of the variety of geometrically different aircraft component designs considering mechanical or thermal requirements. For example, the aircraft which is assembled in the assembling module may be an airplane. The aircraft component may be a primary structural component of the aircraft, like for example a stringer, a frame, a beam or a shell-like structural component. The aircraft component may also be a secondary structural component of the aircraft, like for example a cabin part or a supply line.

According to another embodiment of the invention, the system further comprises a visualization module for visualizing the variety of geometrically different aircraft component designs.

The visualization module may comprise a display for displaying the determined variety of geometrically different aircraft component designs, for example such that each of the variety of geometrically different aircraft component designs is visually allocated to a certain position within the aircraft for which the specific component design is most suitable. It should be mentioned that more than one determined aircraft component design of the variety of geometrically different aircraft component designs may be most suitable for a specific position within the aircraft to be assembled.

According to an embodiment of the invention, the input module is adapted to receive a user-specific evaluation value for prioritizing at least one rule of the set of rules. Furthermore, the processing unit is adapted to sort the set of rules with respect to the priority of the at least one rule based on the evaluation value.

Thus, the different rules of the set of rules can be classified with respect to their importance. For example, it is possible that the user allocates a mechanical load characteristic to a higher priority than a thermal load characteristic such that the mechanical load characteristic has a higher influence for the determination of the variety of geometrically different aircraft component designs than the thermal load characteristic. In this manner, it is also possible to sort the different rules of the set of rules which are representative for different load characteristics such that a specific order of the rules can be determined wherein the rules are a basis for determining the variety of geometrically different aircraft component designs. The evaluation value can be input by the user besides the user-specific load characteristics which are also input by the user.

According to another embodiment of the invention, the processing unit is adapted for determining the variety of geometrically different aircraft component designs based on the input user-specific load characteristics and the sorted set of rules.

Taking into account the sorted set of rules provides the opportunity to consider the influences of different quantities of load characteristics, like for example thermal loads, mechanical loads, etc. The mechanical loads may further be characterized by the load path within the component geometry. Thermal loads may further be characterized by the path along which heat propagates through the component geometry.

According to an embodiment of the invention, the user-specific load characteristics comprise data about an applied force onto at least one of the different component geometries.

The applied force may be a compression force, a tensile force or a torsional force. However, the applied force acts on the component geometry such that the specific load characteristics may also comprise data about a predicted deformation which is due to the applied force onto the component geometry. Therefore, simulation data, like for example data of a finite element analysis, can be used as a data base for the set of rules representative for different load characteristics of different component geometries.

According to another embodiment of the invention, the processing unit is adapted to select one aircraft component design out of the variety of geometrically different aircraft component designs wherein the selected aircraft component design is most suitable for a predetermined position or a specific type of aircraft component within an aircraft to be assembled.

This means that in general each of the variety of aircraft component designs is suitable for the predetermined position or the specific type of aircraft component but a certain aircraft component design is most suitable for the predetermined position or the specific type of aircraft component within the aircraft. Criteria for the suitability may be optical appearance, cost, mechanical behavior, etc. of the aircraft component. However, after selecting the aircraft component design out of the variety of geometrically different aircraft component designs, the selected aircraft component design can be manufactured in the manufacturing module and then assembled to the aircraft in the assembling module.

The selection process of the aircraft component design out of the variety of geometrically different aircraft component designs can also be conducted by the user via the input module. However, it is preferred that the selection is conducted automatically by the processing unit. Therefore, the input user-specific load characteristics can be used as a basis for the selection process.

According to another embodiment of the invention, an aircraft component is manufactured based on the selected aircraft component design using additive layer manufacturing (ALM).

The additive layer manufacturing can be conducted within the manufacturing module. The additive layer manufacturing may be combined with a selective laser melting process. In this manner, it is possible to selectively and locally set material characteristics within the aircraft component to be manufactured.

According to another embodiment of the invention, the input module is adapted to receive user-specific information about interdependencies between aircraft components.

These interdependencies may be characterized by the transmission of mechanical or thermal loads between components within the aircraft to be assembled. Therefore, it is possible to set requirements or constraints based on which the variety of geometrically different aircraft component designs is determined considering adjacent components or load characteristics of adjacent components in case the determined aircraft component design is assembled to the aircraft next to those adjacent components.

According to another embodiment of the invention, the processing unit is adapted to select a plurality of aircraft component designs out of the variety of geometrically different aircraft component designs. The processing unit is further adapted to determine the most suitable positions of the selected plurality of aircraft component designs within an aircraft to be assembled based on the user-specific information about interdependencies between aircraft components.

In this manner, it is possible to consider the load characteristics of neighboring or adjacent aircraft components during the design process or during the determination process of the most suitable positions or during the selection process of the plurality of aircraft component designs out of the variety of geometrically different aircraft component designs. For example, the interdependencies are defined by the transmission of loads between the neighboring aircraft component designs such that these interdependencies influence the selection of the plurality of aircraft component designs out of the variety of geometrically different aircraft component designs and the determination of the most suitable positions of the selected plurality of aircraft component designs within the aircraft to be assembled.

According to another embodiment of the invention, the determination of the variety of geometrically different aircraft component designs by the processing unit comprises a modification of a local microstructure of at least a part of each of the geometrically different aircraft component designs. However, it is also possible that only some component designs of the variety of geometrically different aircraft component designs are locally modified with respect to their microstructure.

Thus, the microstructure of the material of the determined aircraft component designs of the variety of geometrically different aircraft component designs can be adapted such that predetermined mechanical characteristics of the aircraft component to be manufactured can be achieved. In particular, different parts of the aircraft component to be manufactured may have different mechanical characteristics, e.g. a specific deformation behavior due to external loads on this component. In other words, the mechanical characteristics of the geometrically different aircraft component designs and therefore also of the aircraft components to be manufactured may be partially modified such that that the manufactured components are adapted to resist specific tensile or pressure loads. The adaption of the tensile load that must be resisted by the designed component is for instance very important when designing steel rope functions according pulling forces or other components primarily subjected to tension. The adaption of the pressure load that must be resisted by the designed component is for instance very important when hardening tool steel which primarily is subjected to compression.

According to an aspect of the disclosure, an aircraft assembly system comprising a component design system as described above is provided.

The aircraft assembly system may thus use the determined variety of geometrically different aircraft component designs as a basis for assembling the aircraft.

According to another aspect of the disclosure, a method for generating a variety of aircraft component designs is provided. In a step of the method, a set of rules representative for different load characteristics of different component geometries is stored, for example in a data base. In another step of the method, user-specific load characteristics relating to an aircraft component to be generated are input, for example via an interface or an input module. In another step, a variety of geometrically different aircraft component designs is determined based on the input user-specific load characteristics and the set of rules. The determination may be executed by a processing unit.

According to another aspect of the disclosure, a program element which, when being executed by a processor of the component design system, instructs the processor to carry out the step of storing a set of rules representative for different load characteristics of different component geometries, the step of inputting user-specific load characteristics relating to an aircraft component to be generated and the step of determining a variety of geometrically different aircraft component designs based on the user-specific load characteristics and the set of rules.

According to another aspect of the disclosure, a computer-readable medium comprising a program element as described above is provided.

Embodiments of the present invention provide a possibility to map the integral knowledge about structure design and to offer different structure design variants according to defined parameters (input and evaluation parameters (key performance indicators)), rules, options and load paths.

Furthermore, a holistic structure design can be mapped in sub-models and only a part of the whole design can be considered, e.g. only a bracket or a whole galley of the aircraft to be assembled.

A rule library, where the set of rules is centrally stored, further provides the coordination of knowledge within the design process of the component, especially if different people work at different steps. In other words, it is possible to achieve a good overview of applied rules and therefore the importance of the applied rules are known at each step.

Considering the structure characteristics of the components to be generated, the rules applied in background may be identified and linked to an evaluation value according to the importance of the rule. Furthermore, a second kind of rules may also be considered in the rule library, e.g. the rules that, on the basis of the structure shape, define the manufacturing processes for producing a part or component.

Using the set of rules which may be based on results of FEM calculations and tests, provides the creation and optimization of extremely complex models with the most beneficial result which can be revised according to additional and/or latest requirements, for example in an iterative process.

In other words, load paths regarding topologies according to FEM and experiences are picked up and reviewed. Afterwards, the rules and relationships are developed using the FEM results. Simultaneously, a collection of entire requirements and a discovery and selection of relevant load case characteristics is conducted in order to propose an optimized load path, for example by offering a variety of component designs.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The items shown in the figures are not drawn to scale.

Figure 1:
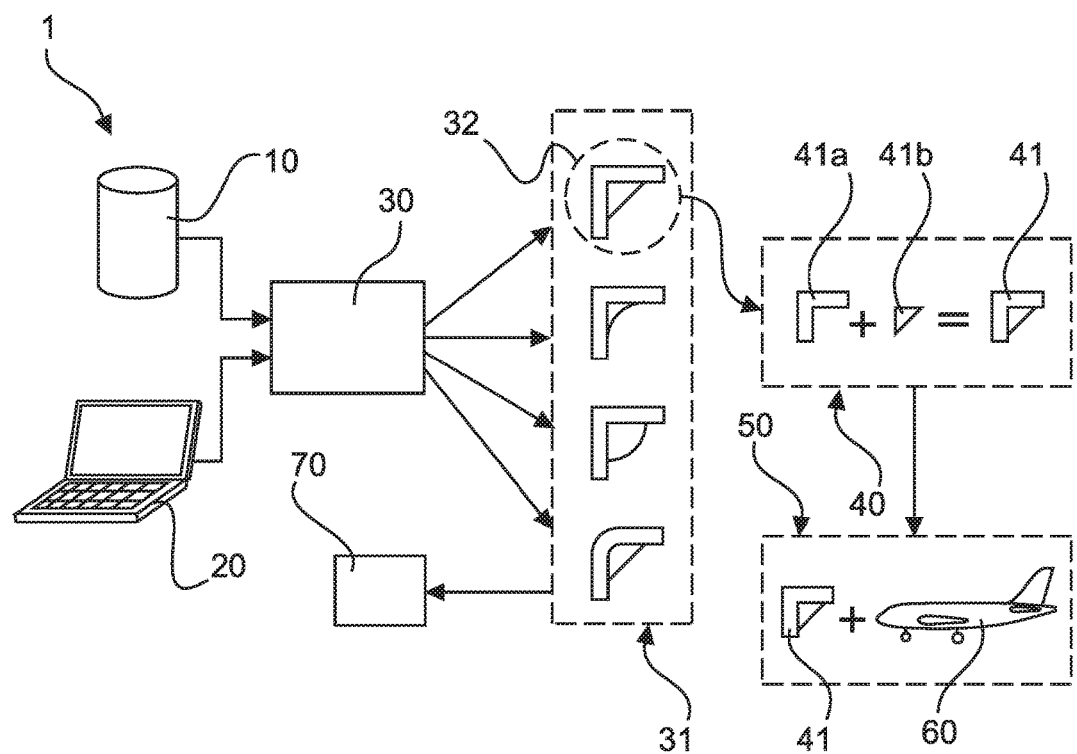
FIG. 1 shows a component design system for generating aircraft component designs according to an exemplary embodiment of the invention.

FIG. 1 shows a component design system 1 for generating aircraft component designs. The component design system 1 comprises a data base 10 as well as an input module 20 and a processing unit 30. A set of rules is stored in the data base 10 wherein the set of rules is representative for different load characteristics of different component geometries. The input module 20 is adapted for inputting user-specific load characteristics relating to an aircraft component 41 to be generated. The processing unit 30 is adapted for determining a variety of geometrically different aircraft component designs 31 based on the input user-specific load characteristics and the set of rules. In other words, the processing unit 30 generates the variety of geometrically different aircraft component designs 31 from which a specific component design is selected. The selected aircraft component design 32, which is indicated by a dashed circle in FIG. 1, provides the basis for manufacturing the aircraft component 41. For example, the aircraft component 41 to be manufactured based on the selected aircraft component design 32 may comprise different parts 41a, 41b from which the aircraft component 41 is manufactured. The manufacturing of the aircraft component 41 may be conducted or executed in a manufacturing module 40. Afterwards, in an assembling module 50, the manufactured aircraft component 41 is assembled to an aircraft 60. In other words, the assembling of the aircraft 60 is conducted using at least one of the determined aircraft component designs 31, e.g. the selected aircraft component design 32.

Figure 2:
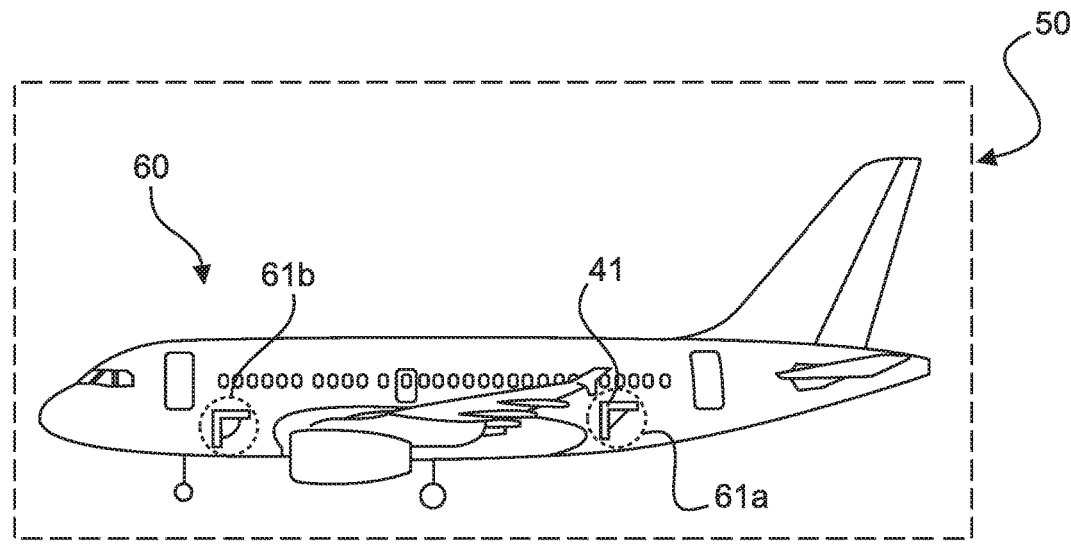
FIG. 2 shows an aircraft to be assembled using an aircraft component in accordance with a determined aircraft component design according to an exemplary embodiment of the invention.

FIG. 2 shows aircraft 60 which is assembled using the aircraft component 41 which was manufactured in accordance with at least one of the determined aircraft component designs 31, e.g. the selected aircraft component design 32. Therefore, the aircraft component 41 is integrated into the aircraft 60 at a certain position 61a. The assembling of the aircraft 60 may be conducted in the assembling module 50. Another aircraft component design may be selected out of the variety of geometrically different aircraft component designs 31 such that the other aircraft component can be manufactured and positioned at another position 61b within the aircraft 60 to be assembled. However, the different manufactured aircraft components which are based on the selected aircraft component designs may be most suitable for different positions 61a, 61b.

Figure 3:
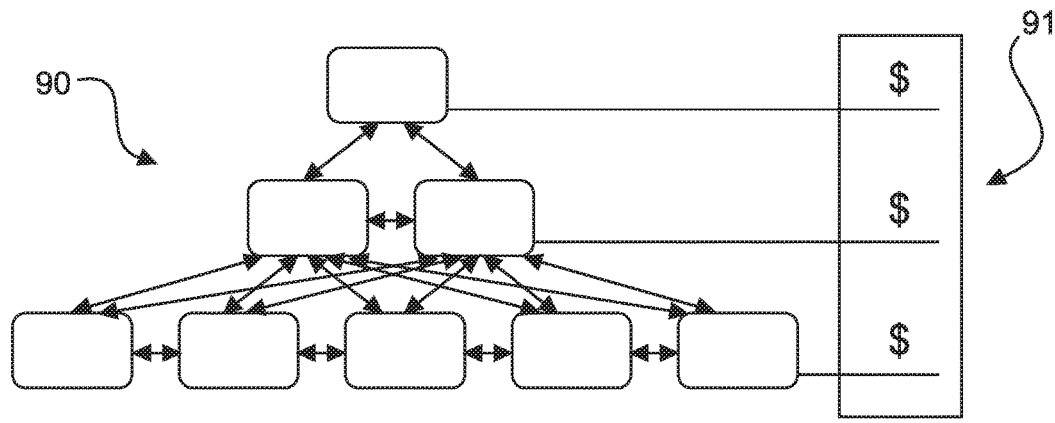
FIG. 3 shows possible links between domain's ontologies according to an exemplary embodiment of the invention.

FIG. 3 shows possible links 90 between domain's ontologies. If several ontologies are taken into account, there may be the possibility to have an overall or detailed report of performance indicators, for example cost. FIG. 3 may further show possible links 90 between different design options of geometrically different aircraft component designs 31 which were determined based on the input user-specific load characteristics and the set of rules. For example, the links 90 show interdependencies between the different aircraft component designs 31. Other influences 91, like for example cost, optical appearance etc., may be used to evaluate or select the certain aircraft component design out of the variety of geometrically different aircraft component designs 31. There may be other influences 91, like for example the availability of a certain aircraft component or the required manufacturing time of an aircraft component.

Figure 4:
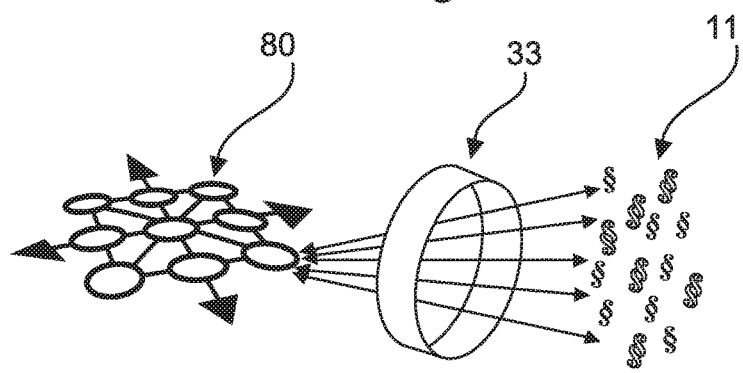
FIG. 4 shows a component optimization process according to an exemplary embodiment of the invention.

FIG. 4 shows a component optimization process based on a finite element method (FEM) comprising a load path definition by means of structure nodes 80. The structure nodes 80 may be related or linked to the set of rules 11 by a description logic 33. In other words, simulation data are used to generate the set of rules 11. The set of rules 11 can then be used as a data base 10 which together with the input user-specific load characteristics provides the possibility to determine a variety of geometrically different aircraft component designs 31.

Figure 5:
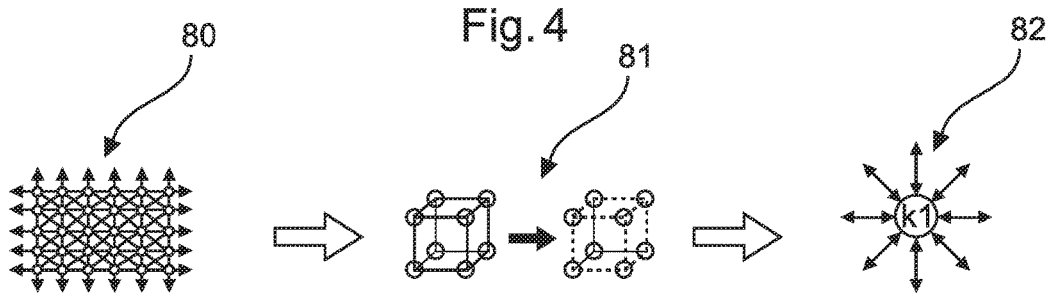
FIG. 5 shows a process for collecting information about relationships of topologies and rules according to an exemplary embodiment of the invention.
Figure 5:
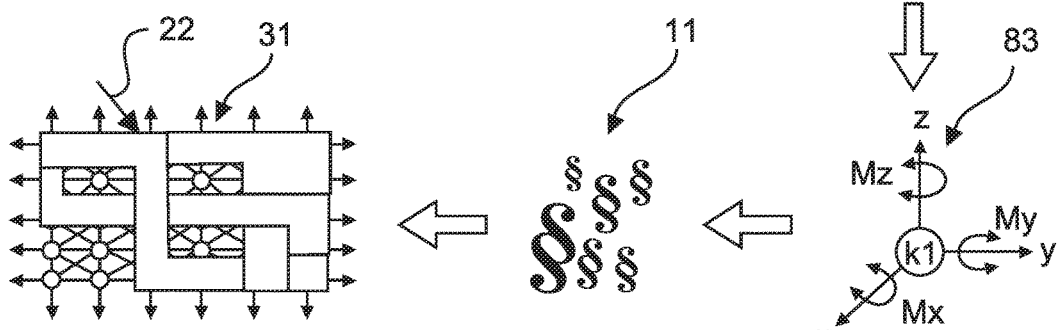

FIG. 5 shows the detailed process for collecting information about relationships of topologies, e.g. component geometries, and rules of the set of rules 11. At first, the data base 10 is generated collecting simulation data or empirical data or test data. FIG. 5 shows an example using simulation data. Therein, the structure nodes 80 are provided during a generic mesh definition. Afterwards, the construction 81 of the part, e.g. a component, into a mesh is conducted. Afterwards, relationships 82 between structure nodes 80 are determined. In a following step, a force and torque definition 83 is conducted for every structure node 80. Based on these simulation data, a set of rules 11 is established which set of rules 11 is representative for different load characteristics of different component geometries. Using the set of rules 11 together with the user-specific load characteristics, e.g. applied forces 22 onto the aircraft component to be generated, leads to the determination of a variety of geometrically different aircraft component designs 31. In other words, the processing unit 30 is adapted to determine the variety of geometrically different aircraft component designs 31 based on the set of rules 11 which is generated during a simulation process or during a collection of empirical data on the one hand and by using the user-specific load characteristics on the other.

Figure 6:
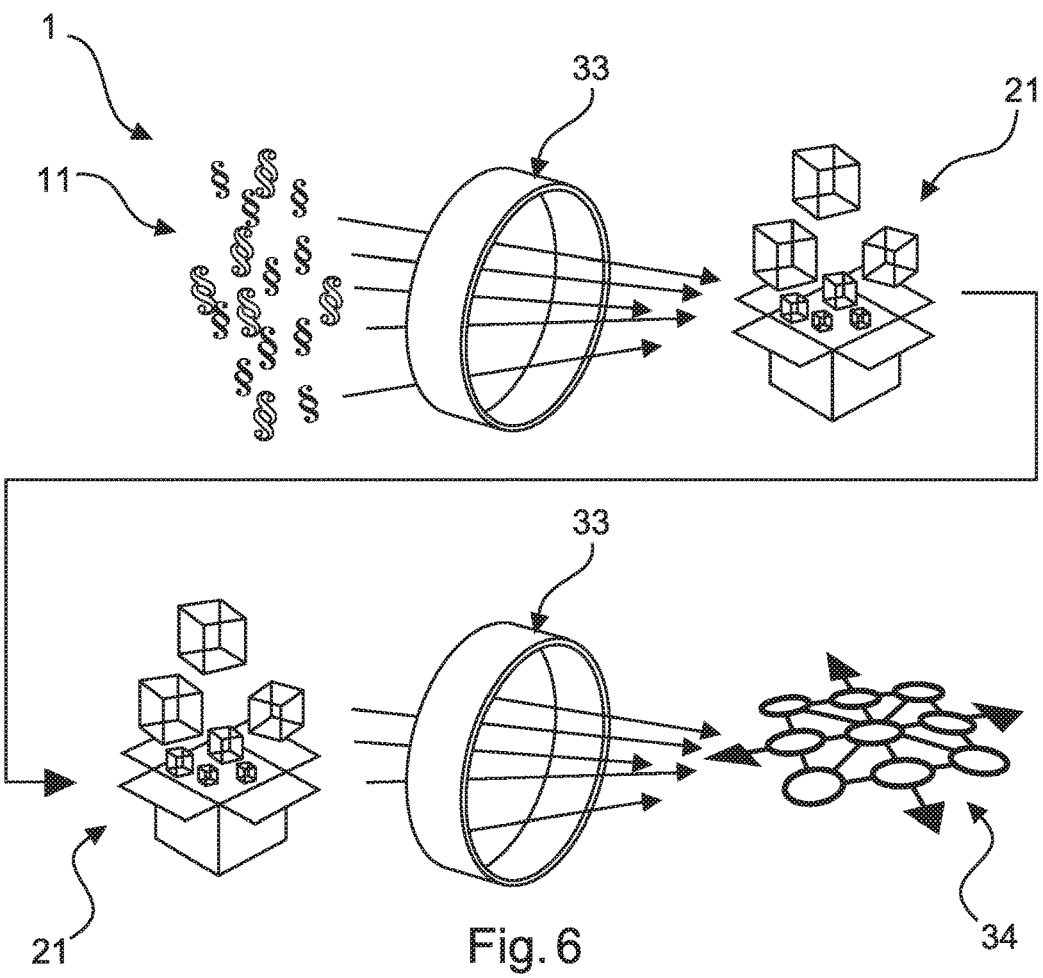
FIG. 6 shows an approach for generating aircraft component designs by a component design system according to an exemplary embodiment of the invention.

FIG. 6 shows the logic for designing and/or optimizing a component by using the component design system 1 for generating a variety of aircraft component designs. The set of rules 11 is the basis for determining the variety of geometrically different aircraft component designs 31. A description logic 33 converts the set of rules 11 which is representative for different load characteristics of different component geometries into data based on which the determination process for determining the variety of geometrically different aircraft component designs 31 can be conducted. Therefore, user-specific load characteristics 21 can be combined with the converted set of rules 11 in order to determine the variety of geometrically different aircraft component designs 31 based on known load paths and user-specific load characteristics 21. Another description logic 33 may convert the inputted user-specific load characteristics 21 into another load path 34 which is representative for at least one of the determined aircraft component designs out of the variety of geometrically different aircraft component designs 31, for example the selected aircraft component design 32.

Figure 7:
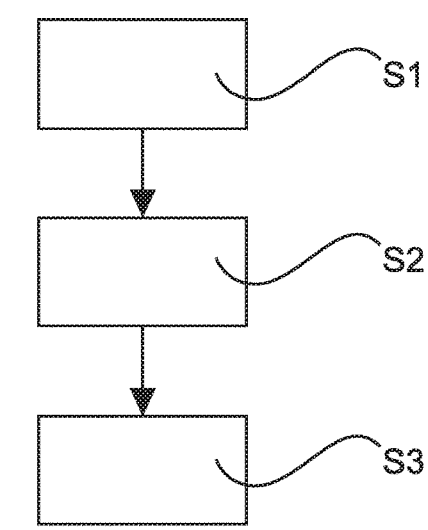
FIG. 7 shows a flow diagram of a method for generating aircraft component designs according to an exemplary embodiment of the invention.

FIG. 7 shows a flow diagram of a method for generating aircraft component designs. In a first step S1 of the method, a set of rules 11 representative for different load characteristics of different component geometries is stored. In another step S2 of the method, specific load characteristics 21 relating to an aircraft component 41 to be generated are input. In another step S3 of the method, a variety of geometrically different aircraft component designs 31 are determined based on the input user-specific load characteristics 21 and the set of rules 11.

The steps S1 to S3 can also be carried out by a processor, for example the processing unit 30. The steps can be carried out based on a program element which can be executed by the processor of the component design system 1.

While embodiments of the invention have been illustrated and described in detail in the drawings and the foregoing description, such illustration and description are to be considered illustrative and exemplary and not restrictive; the invention is not limited to the disclosed embodiments. Variations to the disclosed embodiments can be understood and effected by those skilled in the art and practicing the claimed invention, from a study of the drawings, the disclosure, and the appended claims. In the claims, the term "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of protection.

What is claimed is:

1. A component design system for generating aircraft component designs, comprising:
a data base comprising a set of rules representative for different load characteristics of different structural component geometries, the load characteristics associated with mechanical behavior of the different structural component geometries, and the load characteristics defined by load paths within the different structural component geometries resulting from externally applied forces acting on the different structural component geometries, the load paths describing the distribution of forces within the different structural component geometries;
an input module for inputting user-specific load characteristics relating to an aircraft component to be generated, the user-specific load characteristics including forces applied to the aircraft component to be generated; and
a processing unit for determining a plurality of geometrically different aircraft component designs based on the input user-specific load characteristics and the set of rules.

2. The system of claim 1, further comprising:
a manufacturing module for manufacturing an aircraft component in accordance with at least one of the determined aircraft component designs.

3. The system of claim 1, further comprising:
an assembling module for assembling an aircraft using at least one of the determined aircraft component designs.

4. The system of claim 1, further comprising:
a visualization module for visualizing the plurality of geometrically different aircraft component designs.

5. The system of claim 1, wherein:
the input module is adapted to receive a user-specific evaluation value for prioritizing at least one rule of the set of rules; and
the processing unit is adapted to sort the set of rules with respect to the priority of the at least one rule based on the evaluation value.

6. The system of claim 5, wherein the processing unit is adapted for determining the plurality of geometrically different aircraft component designs based on the input user-specific load characteristics and the sorted set of rules.

7. The system of claim 1, wherein the processing unit is adapted to select one aircraft component design out of the plurality of geometrically different aircraft component designs, which selected aircraft component design is most suitable for a predetermined position or a specific type of aircraft component within an aircraft to be assembled.

8. The system of claim 7, wherein the aircraft component is manufactured based on the selected aircraft component design using additive layer manufacturing.

9. The system of claim 1, wherein:
the input module is adapted to receive user-specific information about interdependencies between aircraft components;
the processing unit is adapted to select a plurality of aircraft component designs out of the plurality of geometrically different aircraft component designs; and
the processing unit is adapted to determine the most suitable positions of the selected plurality of aircraft component designs within an aircraft to be assembled based on the user-specific information about interdependencies between aircraft components.

10. The system of claim 1, wherein the determination of the plurality of geometrically different aircraft component designs comprises a modification of a microstructure of at least a part of each of the geometrically different aircraft component designs.

11. An aircraft assembly system comprising a component design system according to claim 1.

12. A method for generating aircraft component designs, the method comprising the steps of:
storing a set of rules representative for different load characteristics of different structural component geometries, the load characteristics associated with mechanical behavior of the different structural component geometries, and the load characteristics defined by load paths within the different structural component geometries resulting from externally applied forces acting on the different structural component geometries, the load paths describing the distribution of forces within the different structural component geometries;
inputting user-specific load characteristics relating to an aircraft component to be generated, the user-specific load characteristics including forces applied to the aircraft component to be generated; and
determining a plurality of geometrically different aircraft component designs based on the input user-specific load characteristics and the set of rules.

13. A non-transitory computer-readable medium comprising a program element which, when being executed by a processor of a component design system, instructs the processor to carry out a method comprising the steps of:
storing a set of rules representative for different load characteristics of different structural component geometries, the load characteristics associated with mechanical behavior of the different structural component geometries, and the load characteristics defined by load paths within the different structural component geometries resulting from externally applied forces acting on the different structural component geometries, the load paths describing the distribution of forces within the different structural component geometries;
inputting user-specific load characteristics relating to an aircraft component to be generated, the user-specific load characteristics including forces applied to the aircraft component to be generated; and
determining a plurality of geometrically different aircraft component designs based on the input user-specific load characteristics and the set of rules.

* * * * *